3,476,827
**COATING COMPOSITIONS COMPRISING POLY-
SILICIC ACID, SELECTED ORGANIC POLY-
MERS, AND SELECTED SILICONES**
Eugene Herman Engelhardt, Wilmington, Del., assignor
to E. I. du Pont de Nemours and Company, Wilmington, Del., a corporation of Delaware
No Drawing. Filed June 15, 1965, Ser. No. 464,184
Int. Cl. C08g 17/10
U.S. Cl. 260—825   9 Claims

ABSTRACT OF THE DISCLOSURE

Described and claimed are scratch-resistant coating compositions for plastics comprising, in a polar solvent system, about 2–25% by weight of polysilicic acid calculated as $SiO_2$, at least one hydroxyl-containing polymer or polyamide, and about 0.05–5% by weight of polysilicic acid and polymer, of at least one block copolymer of lower alkylene oxides and a lower dialkylsiloxane.

Field of the invention

This invention relates to, and has as its principal objects provision of, improved solutions of polymeric compositions useful for the preparation of relatively thick transparent coatings having superior properties in resistance to abrasion, adhesion to solid substrates and optical quality, and a process employing the same.

Description of the invention

Increasingly severe demands are being made by architects and designers for various transparent enclosures, as in autos and aircraft, and for windows, as in schools, where breakage creates unsafe and undesirable conditions. In many applications, there is need for a transparent material that is capable of easy fabrication into various shapes and which also exhibits superior properties of resistance to shattering, abrasion, cleaning compounds, and the deleterious effect of weathering. Although glass provides many of these properties, for many uses it has disadvantages.

Plastics such as poly(methyl methacrylate) have achieved utility for many uses in enclosures, e.g., for aircraft. Polymers of organic materials have many properties that make them desirable for such applications. For example, they are generally less dense, have excellent resistance to shattering and are easily formed or fabricated and sealed to supports. In general, however, the surface hardness of organic plastics is considerably inferior to that of inorganic glasses. Considerable effort has been expended in the preparation of scratch-resistant coatings. It has been shown in U.S. Patent Nos. 2,404,357, 2,404,426, and 2,440,711 that silica-containing solutions with polymeric alcohols, when applied in carefully detailed procedures, can improve the surface characteristics of the substrate polymer. These materials have not achieved commercial importance since the techniques taught have several disadvantages, e.g., they are difficult and usually expensive to provide a resistant coating of high quality. For example, heating the coating while it is pressed against a polished rigid surface to give a smooth surface and using a plurality of different coatings to obtain useful thickness and hardness are complicated and expensive procedures.

To obtain proper balance of weather, water, and scratch resistance, optical perfection, thermal stability, etc., in the coated organic polymer along with ease and rapidity of application makes demands yet unanswered by present coating and polymer technology. The coating must adhere strongly to the polymer substrate. It should be inert to the effects of weather, solvents, stains, soaps, salts, tar, etc. It should have a glass-like appearance and preferably have a low index of refraction to provide a sheet of high light transmission and low reflectivity. It should also resist collection of dust by static charges, fogging or icing and have low surface friction. In addition, the coating should not seriously reduce the post-forming characteristics of the substrate, e.g., bending a heated polymer sheet.

Investigations have shown that the scratch resistance to polysilicic acid/polymeric alcohol coatings increases in proportion to the thickness of the coating. Heretofore, in general only relatively thin coatings (e.g., up to about a micron) that exhibit good optical quality are obtainable by simple techniques such as by dipping, or flowing a solution containing the coating material. Even by curing between smooth surfaces under pressure, it is difficult to produce thick coatings without retaining the wrinkling or "silking" that occurs on drying. Evaporation of solvent from solutions containing polysilicic acid/polymeric alcohol has given products which, when thicker than a micron, have rough or non-level surfaces with defects of the types known as wrinkling, silking, fisheyes, orange peel, etc. These defects are more pronounced with increasing organic polymer concentration in the coating composition. For many applications such as those when a long use life and considerable abrasion are anticipated, it is substantially essential that thick coatings (suitably of the order of 3 microns or more) of the hard and resistant surface material be present.

It has now been found that improved thick coatings of good optical quality can be obtained from solutions of polysilicic acid and an organic polymer having polar groups, particularly polysilicic acid/polymeric alcohol, by the addition of small amounts (0.05–5%, based on weight of polysilicic acid/polymeric alcohol) of block copolymers of lower alkylene oxides with dimethyl siloxane. The use of such block copolymers promotes even spreading and drying of the coating solution.

The organo-silicone compounds that are useful for the preparation of the thick, optically superior coatings are essentially block copolymers of lower alkylene (2–4 carbon and preferably 2–3 carbon) oxides with lower dialkyl siloxanes and particularly dimethyl siloxane. The block copolymers that have been found useful have a carbon content of from about 49.5–54.5%, hydrogen of from about 8.8–9.8%, and silicon of from about 6.25–9.8% with the remainder being oxygen.

Formulas illustrative of useful organo-silicone polymers are the following:

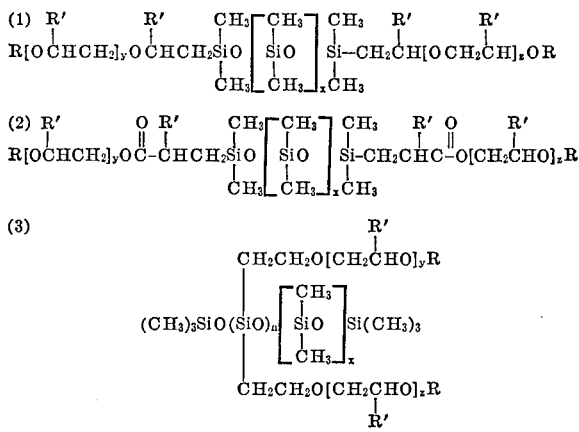

wherein R is H or lower (1–4 carbon) alkyl, R' is H or methyl, y and z are plural integers each of values of the order of 10–20, x represents plural integers of the order of 5–15, and n is a cardinal number of 0–5. The particularly useful organo-silicone block copolymers have a dimethyl silane content of below 20–25%. The useful organo-silicones are soluble in alcohol.

The preferred organo-silicone polymers show from spectral studies the presence of polyalkylene oxides, and $Si(CH_3)_n$ groups where n is 1–3; some have —OH present and some have small amounts of carbonyl (C=O). Particularly preferred are those having units derived from both polyethylene oxide and polypropylene oxide, although for use in producing useful coatings of this invention, organo-silicones having only one of the polyalkylene oxides can be used. Organo-silicone block copolymers included in the above are further described in the literature, e.g., French Patent 1,330,956 or U.S. 3,172,899.

The coating solution employed for the preparation of the smooth thick coatings by evaporation of solvent or diluent has in addition to 0.05–5 parts of the organo-silicone (generally a block copolymer of polyethylene oxide and polypropylene oxide with dimethyl siloxane), 10 to 90 parts of polysilicic acid (calculated as $SiO_2$) and an organic polymer having a plurality of polar groups, especially alcoholic hydroxyl-containing organic polymer in an amount needed to make a total of 100 parts, the total amount being on a weight basis of the silica, organic polymer and silicone, i.e., solids content. The above are used to form a homogeneous solution in which their total amount is from about 2–25% by weight (based on solids). Solvents and/or diluents that are used should boil at a temperature of below about 150° C. and are used in amounts such that the coating solution has a viscosity of about 10–300 cps. The exact viscosity is selected for the method of coating desired and the results to be obtained. For spray applications or rapid withdrawal rates from baths, the viscosity is generally lower than for flowing or dipping using slow withdrawal rates. The solids content and viscosity are generally in direct proportion to the thickness desired in the final film. For example, with a solution of solids content of 10%, an initial thickness of solution layer should be about $75\mu$ to give a final solvent-free coating of about $5\mu$. Solvents generally include the lower alkanols and/or alkanoic acids such as 1–5 carbon alkanols and 1–3 carbon alkanoic acids. These are particularly preferred since they are compatible with the silicic acid which generally is an aqueous alcohol solution. After the solution is applied, solvent is removed preferably by evaporation. Heating of the coating is preferred to ensure complete removal of solvent and promote rapid formation of the hard adherent coating.

The following examples illustrate specific embodiments of this invention. In these examples, parts, percentages and ratios are by weight unless otherwise specified. Example VII represents a preferred embodiment.

EXAMPLE I

A coating solution (150 g.) was prepared containing 6 g. of polyvinyl butyral (having about 20% free alcoholic hydroxyls), 50 g. of an alcohol solution containing polysilicic acid (calculated as 15% $SiO_2$) (prepared by addition of 22.5 parts of 0.1 N hydrochloric acid and 69.5 parts of ethanol to 100 parts of ethyl silicate and aged 8 days). 54 g. of 95% ethanol and 50 g. of acetic acid. The solution contained about 12 g. of solids (6 g. of polyvinyl alcohol derivative/6 g. of $SiO_2$). The solution was coated on poly(methyl methacrylate) sheets (4″ x 4 x 3/16″) by immersion in the coating bath for 2 minutes followed by withdrawal at a rate of 8–10 in./min. The coated panels were placed in an air-circulating oven for ½ hour at 150° C.

When about 0.07 g. of an organo-silicone block copolymer (0.58% of total solids), a block copolymer of alkylene oxide with dimethyl siloxane (Union Carbide Corp. "L-530"), was added, the surfaces of the coating were smooth. In contrast when the silicone was absent, wrinkled, silky, and "orange-peel" surfaces resulted. The coatings were about 5 microns thick.

When a coated and baked panel having the aforementioned organo-silicone present in the coating was subjected to a second dipping, the top coating did not adhere.

EXAMPLE II

A solution was prepared containing 106.4 g. of polysilicic acid (15% silica made by addition of 22.5 parts of 0.1 N HCl and 69.5 parts of ethanol to 100 parts of ethyl silicate and aged 5 days), 53.4 g. of 10% polyvinyl alcohol/propanal (having about 50% free hydroxyl) in 70/30 ethanol/water and 40 g. of acetic acid. The silica/polyvinyl alcohol weight ratio was 75/25. To identically formulated solutions was added 1, 2 and 3% of the alkylene oxide-dimethylsiloxane block copolymer of Example I (based on total solids). Panels were coated by the general procedure of the preceding example. Coatings prepared from solutions containing the organo-silicone block copolymer at the concentrations used were all optically clear (without silkiness and wrinkles), whereas the control was heavily wrinkled. The thickness of the coatings averaged $7\mu$.

EXAMPLE III

The general procedure of Example II was repeated except that the amount of organo-silicone copolymer added (based on weight of solids, i.e., silica/polyvinyl alcohol) was 0.03, 0.06, 0.12, 0.25, 0.5, 5.0 and 10%. Optimum results were obtained for wrinkle-free surfaces of coatings of about $6\mu$ when the organo-silicone was present in amounts of 0.12% or more with some superiority to unmodified solutions noted at 0.06%. When more than about 5% of the organo-silicone was present, haziness in the coating was noted as well as decreased resistance to scratching by steel wool or a scouring powder. Optimum resistance to the latter was at 0.25–1% (see Examples I and II for 1, 2 and 3%).

EXAMPLE IV

A coating solution was prepared as follows:

| | G. |
|---|---|
| Polysilicic acid solution (prepared as in the prior examples and aged 10 days) | 116.4 |
| 10% solution of partially hydrolyzed polyvinyl acetate about 50% hydrolyzed) in 70/30 ethanol/water | 43.6 |
| Acetic acid | 40 |
| The organo-silicone copolymer of Example I (0.03% on a solids wt. basis) | 0.65 |

Panels of poly(methyl methacrylate) (4″ x 4″ x 3/16″) were dipped into the solution and after two minutes withdrawn at a rate of 6″/min. After baking for ½ hour at 130° C., coatings of about 5μ thickness were obtained. These were free from wrinkling, whereas a control coating made without addition of the organo-silicone was heavily wrinkled.

EXAMPLE V

A bath containing silica, hydroxyl-containing organic polymer and organo-silicone block copolymer in the ratio of 44.12 $SiO_2$ (polysilicic acid)/55.57 hydrolyzed copolymer of vinyl acetate-tetrafluoroethylene (of about 3–1 mole ratio)/0.31 organo-silicone copolymer was prepared and used to coat 152 poly(methyl methacrylate) sheets, 134 of which are 2 ft. x 3 ft. sheets coated both sides for about 766 sq. ft. of coated surface and 18 were smaller panels curved during or after baking. Total surface coated was 1081 sq. ft. The actual withdrawal rates from the bath ranged from 11.3″/min. to 15.1″/min., dependent on sheet thickness, and an average of 5.45 g. of solution was withdrawn for each square foot of coated surface (10.9 g. for two sides). The sheets were baked ½ hour at 150° C.

During the coating time, which lasted 7 days, it was found that modification with about 3.3% of butyl "Cellosolve"® yielded sheets which could be exposed to at least 80% R.H. air for 5 minutes, then baked without development of haze due to humidity. Prior to this, the first 48 sheets, although withdrawn in 40% R.H. air for only 4–5 minutes before baking, exhibited about a 1″ band of haze at the top. Nevertheless, the bottom 95% of the coated area was substantially clear.

The coating bath initially employed had the following composition:

| | G. |
|---|---|
| 8.46% hydrolyzed vinyl acetate/tetrafluoroethylene in methanol (pH=8.5). | 2680 |
| 1% HCl in methanol (pH after addition= 4.35). | 80 |
| Methanol | 320 |
| Hydrolyzed tetraethyl silicate made by mixing 100 parts of $(EtO)_4Si$ with 69.5 parts of ethanol and 22.5 parts of 0.1 N hydrochloric acid, and aged 2.5 days before use. | 1200 |
| Glacial acetic acid | 1720 |
| Organo-silicone (Union Carbide Organo-Silicone Copolymer "L–530"), a block copolymer of ethylene oxide and propylene oxide with dimethyl siloxane. | 1.28 |
| | 6001.28 |

Apparent "pH"=.38; pH upon dilution with water, 2.25; contained 3.78% of hydrolyzed tetrafluoroethylene copolymer +3% polysilicic acid calculated as $SiO_2$.

After about 8 hours, a ¼ portion of the formulation of the original bath was added and during the next 24 hours, about 260 g. of the bath was removed. The bath then contained about 5100 g. of material. At this point, 175 g. of butyl "Cellosolve"® in 235 g. of acetic acid was added. After further use at approximately daily intervals, additional portions of the original formulation were added to give a total bath content of 11,800 g. of which 6,010 g. was consumed in production of coatings. The amount of coating solids per sq. ft. per side of plastic sheet was about 03.7 g.

The thickness of the applied coatings was 3.22μ with an average deviation from the mean of 0.16μ (<5%) for the 71 measurements made. The average values for each of the five sheets (selected from 152 prepared) also had a deviation from their mean of <5%. The coating which had substantially no optical defects had a density of about 1.25 g./cc.

A coated poly(methyl methacrylate) sheet prepared substantially as above when exposed in a carbon arc Weather-Ometer (at 102 min. dry followed by 18 min. spray, the surface reaching a temperature of 63° C. before spray) was in satisfactory condition after 1391 hours. Using a wiping tester under 100 g. load with 600 cycles per hour with wet whiting, the scratch resistance of the initial coatings was 99% for the coated polymer. After one hour's immersion in water at 60° C. the product had a rating of 96% and after 64 hours in water at room temperature the coating was rated 87%.

The following is a description of a preparation of a hydrolyzed copolymer of vinyl acetate with tetrafluoroethylene as used above. Into a 2-gallon autoclave was charged:

| | | |
|---|---|---|
| Water | ml | 4000 |
| Vinyl Acetate | g | 1040 |
| Tetrafluoroethylene | g | 800 |
| Isopropanol | ml | 60 |
| $NaH_2PO_4$ | g | 14 |
| "Duponol"® ME (sodium alkyl sulfonate) | g | 20 |
| Azobiisobutyramidine·HCl | g | 6 |

Polymerization took place at a temperature of 50° C. for 0.6 hour at a pressure (autogenous) of 400–450 p.s.i. A stable emulsion, easily discharge from the autoclave, was obtained. Conversion based on vinyl acetate was essentially 100%. Approximately 65% of the charged tetrafluoromethylene monomer was incorporated into the polymer to give 1500 g. of a copolymer of vinyl acetate/tetrafluoroethylene of molar ratio 2.4/1, ηinh of 2.45, refractive index of 1.40–1.41 and M.W. (light scattering) of about 750,000.

The emulsions were coagulated by mechanical shear in conjunction with the addition of a small quantity of saturated NaCl solution. Flocculation of the fine particles was accomplished by blowing steam directly into the coagulation vessel and heating the contents to about 50° C. A sandy product (about 500μ particle size) of easily washable material was obtained. On drying, the small particles tended to agglomerate. Passage through a small Abbé cutter gave an average particle size of roughly 1000μ.

A total of 5 pounds of vinyl acetate/tetrafluoroolefin copolymer obtained as above was hydrolyzed in a ten-gallon, glass-lined kettle. The charge consisted of: 2268 g. of the copolymer, 132.11 g. of methanol, and 4.5 g. of sodium methoxide. At a temperature of 50° C., five hours were required for elimination of the carbonyl stretching absorption at 1700 cm.$^{-1}$. Subsequent to hydrolysis, the solution was passed through a Sparkle filter to remove foreign particles (lint, etc.). The clear, slightly yellow solution had a solids content of 10.2% and a Brookfield viscosity (corrected to 10% solids) of 2200 cp.

EXAMPLE VI

A solution was prepared with 10 g. of tetrafluoroethylene/2-hydroxyethyl vinyl ether (molar ratio of 1/1) in 40 g. of ethanol and 2.5 cc. of 1% hydrogen chloride in methanol and mixed with a solution containing 36.8 g. of 15% silica (obtained from a stock solution prepared by mixing 200 g. of ethyl silicate, 139.6 g. of absolute ethanol and 45 g. of 0.1 N hydrochloric acid at room temperature), 3.8 g. of acetic acid, 5 g. of butyl "Cellosolve"® and 0.064 g. of organo-silicone block copolymer (Union Carbine organo-silicone copolymer "L–530").

Coatings on poly (methyl methacrylate) were obtained at a withdrawal rate of 8″/min. followed by baking for ½ hour at 150° C. The coatings were about 2.8–3.0μ thick, scratch resistant (based on the wet whiting abrasion test they have a rating of 100% (no sign of abrasion), and after one hour exposure in water at 60° C. a rating of 93%), and only slightly affected by abrading with steel wool as prepared as well as after 64 hours in water at room temperature. No deterioration was observed in accelerated weathering tests (ASTM) for 1734 hours and for over eight months outdoors at a 45° angle facing south. In the absence of the organo-silicone block copolymer, coatings of good optical quality could only be obtained by adjusting the withdrawal rate downward to yield a maximum thickness of $1\mu$.

EXAMPE VII

A series of coating solutions was prepared containing a ratio of about 30 $SiO_2$/70 4-hydroxybutyl vinyl ether-tetrafluoroethylene copolymer (of ratio of about 1/1).

The polysilicic acid ($SiO_2$) content varied from about 2.57 to 3.37%, the copolymer from 5.88 to 7.99%, water from 3.11 to 8.03%, ethanol from 11.62 to 71.20%, water alcohols (methyl, n-butyl, t-butyl or isopropyl) from 0 to 70.67%, acetic acid from 0 to 12.05% and organo-silicone copolymer (U.C.C. organo-silicone copolymers "L–520," "L–522") from 0.02 to about 0.08%. The solutions were also used after aging up to 51 days at which time they had undergone relatively minor changes.

Coatings on poly(methyl methacrylate) sheets at withdrawal rates of 3 to 12 in./min. after baking gave thicknesses of about 2.6 to $4.2\mu$. Those which had organosilicone copolymer present were relatively free from silkiness (ridging, uneven flow). The panels were scratch resistant (Taber test) and had resistance to soap.

Coatings similarly obtained but at much higher withdrawal rates, e.g., 18–30 in./min. are thicker and generally exhibit good surface properties.

EXAMPLE VIII (A) A coating solution was prepared containing 20 g. of polysilicic acid solution (15% $SiO_2$, prepared as in Example I), 20 g. of acetic acid, 50 g. of a solution in t-butyl alcohol of 12.78% 3-hydroxypropyl vinyl ether-tetrafluoroethylene copolymer of ratio of about 1/1. The ratio of $SiO_2$ to polymer was 31/69.

(B) A second solution consisted of 88.5 g. of solution A with 10 g. of 80/20 tert. butyl alcohol/acetic acid and 0.046 g. of U.C.C. organo-silicone copolymer "L–520."

Poly(methyl methacrylate) panels coated with the above solutions using a withdrawal rate of 12"/min. and baking ½ hour at 170° C. had excellent scratch resistance to steel wool. Coating A (without added alkylene oxide-alkyl siloxane block copolymer) gave a good coating which, however, exhibited a silky appearance. Coatings with B were excellent optically and resistant to soap, hot water and scratches. The coating thickness was about $3.6-3.9\mu$.

EXAMPLE IX

A solution was prepared from 25 g. of 15% silica solution (prepared as in Example I) and 85 g. of t-butyl alcohol solution containing 11 g. of a copolymer of 4-hydroxybutyl vinyl ether/2-hydroxyethyl vinyl ether/tetrafluoroethylene in 1/½ ratio ($SiO_2$/polymer ratio of 25.5/74.5), 20 g. of acetic acid, and 0.092 g. of the organo-silicone block copolymer (Example I).

Panels of poly(methyl methacrylate) were coated as in Example I at a withdrawal rate of 12"/min. followed by ½ hour at 170° C. The coatings had excellent scratch resistance and were thick ($4.5\mu$) and free of surface roughness.

EXAMPLE X

A washed and dried copolymer of tetrafluoroethylene/4-hydroxybutyl vinyl ether of about 1/1 molar ratio was dissolved in tert. butyl alcohol to a solids content of 9.97%. Using this polymer a bath of polysilicic acid (30 $SiO_2$)/tetrafluoroethylene-4-hydroxybutyl vinyl ether (70)/organo-silicone copolymer 0.35% based on total solids, solution was prepared and used to dip coat 142 poly(methyl methacrylate) sheets over a four-day period, 135 of which were 2' x 3' sheets partially coated on both sides and 18 were smaller panels formed into curved objects after baking. Total surface coated was 1075 sq. ft. Withdrawal rate from the bath was about 12"/min. Subsequent to coating, the sheets were baked ½ hour at 170° C. in an air-circulating oven. The coating operation was carried out at ambient temperature and relative humidity of 75° F. and 35% respectively.

The coating bath initially employed had the following composition:

| | G. |
|---|---|
| Hydrolyzed tetraethyl silicate made by mixing 100 parts of ethyl silicate with 47 parts of ethanol and 45 parts of 0.1 N hydrochloric acid 3 days before use | 982 |
| The above-described 10% solution of 4-hydroxybutyl vinyl ether/tetrafluoroethylene in t-butyl alcohol | 3450 |
| N-butyl alcohol | 451 |
| Glacial acetic acid | 1206 |
| Organo-silicone (Union Carbide Corp. organo-silicone copolymer "L–520," a block copolymer of alkylene oxide with dimethyl siloxane) | 3.0 |
| | 6092.0 |

During the run, additional portions of the original formulation were added at intervals ranging from 12 to 20 hours to give a total bath content of 12.18 kg., of which 7.60 kg. was used in coating the panels.

The thickness of the coatings ranged from 3.5 to 4 microns. (Coated poly(methyl methacrylate) sheets prepared substantially as above had high optical quality and performed satisfactorily in a carbon arc Weather-Ometer (at 102 min. dry followed by 18 min. spray at a dry surface temperature of 63° C.); whereas, coatings based on a 60% silica/40% polyvinyl propanol solution fail after 350 hours. The coatings are superior in this respect to coatings prepared with polysilicic acid and hydrolyzed copolymer of tetrafluoroethylene with vinyl acetate (44/56) which have secondary rather than primary hydroxyls. The scratch resistance rating with the wiping tester with wet whiting was 100%, and with foaming scouring powder was 99%. Cold and hot (60° C.) water immersion of the coating followed by wiping with cleanser resulted in a rating of 95–99%.

Post-formability of the coatings on ⅛" poly(methyl methacrylate) sheets can be demonstrated by reheating the panels to 140–150° C. for about 10–15 minutes followed by draping in a curved form. A radius of curvature of about 2¾" is obtained without optical defect. This corresponds to an apparent tensile and compressive deformation of about 2.5%.

A composition similar to the preceding except that it had been diluted with ethanol to give a 4% solids solution was applied by conventional spray application as a topcoat of a thickness of about 3 microns over a typical pigmented acrylic automotive finish. After a five-minute air flash and a 30-minute bake at 135° C. (275° F.), the resulting topcoat imparted greatly improved mar, scratch, and solvent resistance to the automotive finish, and restored gloss to a chalked finish.

Freshly cleaned samples of iron, steel, brass, and copper were partially immersed in a similar coating solution, allowed to soak 2 minutes, withdrawn at a rate of 9"/min., air flashed 5 minutes and baked 30 minutes at 105–170° C. The coating thickness on these samples was about 1.5–$3.5\mu$. The partially coated samples were exposed for 1.5 months in Delaware, 45° south. At the end of this period, the coated steel, brass, iron, and copper samples showed greatly improved tarnish and corrosion resistance over the uncoated sections of the samples.

Tetrafluoroethylene/hydroxyalkyl vinyl ether copolymers are readily prepared by conventional methods as illustrated by the following: A 2-gallon reactor was charged with 5500 cc. of t-butyl alcohol, 26 g. of potassium carbonate, 330 g. of 4-hydroxybutyl vinyl ether, 0.9 g. of azodiisobutyronitrile, and 390 g. of tetrafluoroethylene, heated to 65° C. for 3.5 hours at a pressure of about 140 p.s.i. The copolymer had an inherent viscosity of 0.70 and contained 35.78% F. Hydroxyaliphatic vinyl ethers are readily obtained by reacting acetylene with molar amounts of appropriate dihydroxy compounds, especially glycols, followed by separation of the desired product.

EXAMPLE XI

To a solution of 10 g. of 15% polysilicic acid in aqueous alcohol was added 10 g. of a solution of 80/20 alcohol/water containing about 10% of polyhexamethyleneadipamide / polyhexamethylenesebacamide / polycaproamide, 10 g. of acetic acid and 0.032 g. of the organo-silicone described in Example I. Coatings were applied to poly(methyl methacrylate) sheet, poly(ethylene terephthalate) film, vinyl fluoride film and a polycaproamide. After baking for ½ hour at 150° C., smooth coatings were obtained. When silicone was not used, the films were not smooth. The addition of the organo-silicone to a solution of polysilicic acid containing poly(methyl methacrylate) also resulted in smooth coatings on poly(methyl methacrylate).

When the general procedures of the above examples were repeated except that a series of available leveling, flowing and similar surface-active agents (mostly of available silicones and organo-silicones) were used in amounts of 0.02–3.0%, optimum surface properties of the coated poly(methyl methacrylate) panels resulted from alkylene oxide/methyl siloxane block copolymers such as those designated as Union Carbide Corp. "L–520" and "L–530" were employed. Also useful were "L–522" and "L–5310." Other agents including silicone- and non-silicone-containing agents did not produce the desired properties in coatings of optical smoothness, clarity and adhesion to substrate under varying conditions, scratch resistance of thick coatings, etc. Examples of such agents that did not give improved optical characteristics are polyethylene oxides, polypropylene oxides, and dimethyl siloxane oils that have use in other applications as dispersing and leveling agents. Also, organo-silicones that have over 25% dimethyl siloxane content do not appear to be useful for the present purposes. For example, Union Carbide L–75–79 series of block copolymers of dimethyl siloxane with alkylene oxides containing more than 25% dimethyl siloxane, as well as others, are not effective in preventing the "silkiness" of thick coatings.

There are several critical properties in which coating of a thick layer of the organo-silicone-containing composition as defined for this invention, e.g., a polysilicic acid/hydroxyl-containing polymer/organo-silicone polymer, excels over coatings described in the art. Tests that are useful to determine the physical characteristics of the coatings include the following: Thickness can be measured by interferometry [see Bechtold, J. Opt. Soc. 37, 873–8 (1947)]. Resistance to exposure was observed by the use of the carbon arc Weather-Ometer (ASTM–E–42–57) and outdoor testing. Scratch resistance can be quantitatively determined by the Taber Abraser [American Standards Association Test Z 26.1–1950] and the falling carborundum test [ASTM–D673–44]. Haze and luminous transmittance are determined by ASTM D1003–61. Other tests also useful include application of soap (e.g., mark with soap, keep at 100% R.H. for 16–64 hours) and soap solutions, washing, wiping, rubbing with steel wool, etc.

The following is a description of a wiping tester that has been found especially useful in determination of the superior scratch-resistant properties of the products of this invention. To a 12" long crank arm attached one inch off center to a wheel driven by a motor at a speed of 60–72 r.p.m. is further attached at the other end a half cylinder of about 2" diameter and length. To the curved bottom is attached generally about eight thicknesses of cheesecloth, the cloth saturated with the whiting, abrasive or cleanser, either dry or wet with the weight being generally about 100 g. on the pad. Comparisons are obtained after a cycle of generally 600 oscillations. Panels of uncoated poly(methyl methacrylate) are severely scratched and rated 0%; coated panels showing no scratches are rated 100% and intermediate ratings are obtained by comparisons of uncoated panels abraded at less than 600 oscillations. For example, a coated panel scratched as much as by 600 oscillations as a non-coated panel at 60 oscillations is rated 90% while a panel abraded as much as by 600 oscillations as a non-coated panel is by 450 oscillations is rated 25%.

The polysilicic acid employed with the polar organic polymers is readily available. For example, ethyl silicate (tetraethyl orthosilicate) is a commercial product. It is soluble in organic solvents and readily hydrolyzed by water to a useful soluble polysilicic acid. By use of varying amounts of water, the exact degree of hydrolysis can be varied. A compatible solvent system is a lower alcohol, particularly ethanol. A general formula for the preparation of the polysilicic acid solutions (15% $SiO_2$) is 100 parts of ethyl silicate, 92–X parts of ethanol or similar diluent where X is the amount of water or preferably 0.1 N hydrochloric acid. In general, X is preferably about 22.5 or greater. When X is 18 or less, the hydrolysis of ethyl silicate is insufficient to give a good polysilicic acid for use in this invention, unless further hydrolysis is brought about in the coating solution or process. Although more water can be used, X=up to 50 or more, such large amounts are generally not necessary and may affect adversely the compatability with some of the organic polymers to be used.

Solvents useful for the preparation of coating compositions depend on the polymeric materials employed, substrate, and other factors such as evaporation rate, etc. It is usually desired that the solvent system have appreciable vapor pressure at below 100° C. and boil below 150° C. and preferably below about 100–125° C. It should be compatible with the ingredients in a wide range of proportions. The solvents are generally highly polar in nature. Preferred solvent systems have at least 50% of 1–5 carbon alkanols (e.g., methanol, ethanol, propanols, butanols), 2–15% of water and up to about 40% of 1–3 carbon alkanoic acids and/or halogenated (chlorine- and/or fluorine-containing) hydrocarbons such as trichloroethylene. For coating on poly(methyl methacrylate), at least 10% of acid should be present. Adjuvants, such as small amounts of "Cellosolve"® derivatives, are useful as antihaze agents.

As previously stated, the amounts of hydroxyl-containing polymeric material and polysilicic acid (calculated as $SiO_2$) are in a 10–90 to 90–10 proportion. For thick coatings on poly(methyl methacrylate) polymer, the preferred proportions are 20–50 of polysilicic acid to 80–50 of the organic polymer with 0.12–1 part of organo-silicone block copolymer/100 parts of solids to give the most useful combination of surface hardness, adhesion and optical quality. Optimum properties, especially alkali resistance and formability, are obtained at about 25–35% polysilicic acid/75–65% hydroxylated polymer although the optimum properties depend upon the specific polymer, substrate, solvents, and conditions used. It is generally preferred that a solvent be present which aids in adhesion to the specific substrate, e.g., with poly(methyl methacrylate) a lower alkanoic acid generally gives superior coatings when employed in an amount of 5–50% of the total coating solution.

The compositions of this invention contain, in addition to the selected silicone alkylene oxide block copolymer and polysilicic acid, a clear compatible polymer that has a plurality of groups which are reactive with silicic acid upon removal of inert diluents and particularly upon heating. The polymers that are illustrated in the preceding are soluble and, preferably, have a plurality of alcoholic hydroxyl groups. They include polyvinyl alcohol and its derivatives, such as partially hydrolyzed polyvinyl acetate, polyvinyl alcohol containing ester or acetal groups (which are hydrolyzable to hydroxyl). Also included are copolymers such as vinyl ester or alcohol-containing vinyl monomers with polymerizable ethylenically unsaturated compounds. The polymeric hydroxyl-containing compositions must be soluble in solvents compatible with polysilicic acid solutions. Thus, they are linear (non-crosslinked). Preferably they are solids softening (zero strength) above 50° C. and have a degree of polymerization of at least 100 and generally more than 500.

Included are polyvinyl alcohol and derivatives such as illustrated in U.S. Patent Nos. 2,404,357, 2,404,426 and 2,440,711. Recently discovered and described in copending coassigned applications (Ser. Nos. 464,064 and 464,063, filed herewith, now U.S. Patent No. 3,429,846 and 3,429,845, granted Feb. 25, 1969, respectively. The entire disclosures of these two applications are hereby specifically incorporated by reference herein) are superior coating compositions based on hydroxyl- and fluorine-containing polymers. In general, for use in preparing coatings the linear aliphatic alcoholic hydroxyl-containing polymer has a ratio of from 1 alcoholic hydroxyl per 2 chain carbons to 1 alcoholic hydroxyl per up to 20 or more carbons of the chain or of each repeating unit of a copolymer.

It has been found that fluorine-containing coating compositions have preferred properties of adhesion, thermal stability, resistance to scratching and sunlight, low refractive index, etc. These preferred polymers have at least 10% and preferably about 15–50% fluorine present in the copolymer, or a ratio of preferably one or more fluorine atoms per hydroxyl group. These polymers are readily available through the use of selected monomers by the general procedures disclosed in the preceding examples. Particularly useful are copolymers of tetrafluoroethylene with ω-hydroxyalkyl vinyl ethers of the formula $$CH_2=CHO(CH_2)_{2-10}OH$$

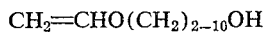

The solution can generally be used in coating for several weeks after preparation, particularly if care has been taken to employ relatively pure ingredients and compatible solvents and additives.

The solutions can be applied to the surfaces to be protected by known methods such as flowing, spraying, or dipping. Although substrates of relatively soft plastic sheet materials show considerable improvement after application, the coating composition can be applied to other materials, including painted surfaces, metals, glass, wood, etc., to give thick coatings of good properties.

The final hard coating results from removal of solvent and volatile materials. This can be accomplished by air drying or by the use of heat as in an oven. Higher temperatures which do not cause substantial changes in the shape of the substrate facilitate removal of solvent and possible reaction of the polysilicic acid and hydroxylated polymer to form a hard cured surface coating inert to moisture, soaps, and organic liquids.

Although the exact method by which the selected organo-silicones prevent "silkiness" of thick coatings is not known, it is possible they migrate to and concentrate in extremely thin layers at the air-coating interface. Thus they may tend to plasticize the surface layer and keep it permeable, thereby reducing surface stresses during evaporation of solvents.

Thick coatings, e.g., >2µ, are particularly useful in their greater resistance to coarse abrasives than thinner coatings. Heretofore, it has been difficult to obtain thick coatings of good resistance to cracking during weathering and good optical quality. With the coating composition of this invention, even thicker layers, e.g., up to 17 microns or more, are readily available. The thick coatings can be thoroughly cured by baking in air at 170° C. without cracking due to shrinkage stresses on baking. Such coatings are difficultly marred by calcite (Moh's Hardness of 3), about equal in hardness to apatite (Moh's Hardness of 4), but can be scratched by fluorite (Moh's Hardness of 5).

The organo-silicone-containing compositions of this invention are useful for the preparation of smooth thick coatings. With the selected organo-silicone block copolymer present, withdrawal rates can be increased and solutions used which have a high solids content. When the solutions are used as a spray or simply spread on a flat surface by techniques such as curtain coating, etc., they promote the formation of high quality coatings.

The compositions of this invention furnish insoluble, inert, abrasion-resistant, corrosion-resistant finishes that are also useful in changing the surface frictional, electrical, gas permeability, liquid and ionic diffusional properties and the optical properties (refractive index) of mechanical, electrical, optical, osmotic, filtration or other devices or essential parts thereof as well as the properties of leather, fibers, fur and textiles. By choice of solvent and component polymers, application conditions and pretreatments (including prime-coating) of the substrates, they can be adhered to substantially all solid surfaces. The composition of this invention is therefore useful for coating on wood, metal, glass, and relatively dimensionally stable synthetic organic polymeric materials in sheet or film form such as poly(methyl methacrylate), polyesters (including objects having fiber fillers), polyamides, polyimides, copolymers such as of acrylonitrile/butadiene/styrene, etc. It can be applied to natural and synthetic fibers of fibrous products and as coatings in contact with anti-reflective layers for optical applications. Pigments, metal flakes or dyes can be added to the coating composition and applied to various objects such as automotive bodies and parts, refrigerators, etc. Polymeric materials coated with these new compositions are useful in the fabrication of flat or curved plastic enclosures, such as windows, skylights, windshields, lenses, etc., particularly for transportation equipment. The composition can also be used to give cast objects having good surface properties, including fibers and films, of relatively high stiffness, e.g., by use of polytetrafluoroethylene substrate, in a suitable form such as a film from which the object can be removed.

The embodiments of the invention in which an exclusive property or privilege is claimed are defined as follows:

1. A coating composition in a polar solvent system comprising
   about 2–25% by weight of polysilicic acid (calculated as $SiO_2$) and at least one organic polymer having polar groups, said polymer being selected from the class consisting of polyvinyl alcohol, partially hydrolyzed polyvinyl esters and acetals, hydrolyzed copolymers of vinyl esters and ethylenically unsaturated compounds, copolymers of ω-hydroxyalkyl vinyl ethers and ethylenically unsaturated compounds, and polyamides and, additionally,
   about 0.05–5% by weight, based on the weight of polysilicic acid and the organic polymer, of at least one block copolymer of lower alkylene oxides and of up to 25% by weight of dimethyl siloxane in which the alkylene oxide blocks are attached to silicon through carbon, said block copolymer having, by weight, a carbon content of from about 49.5–54.4%, a hydrogen content of from about 8.8–9.8%, and a silicon content of from about 6.25–9.8%, the remainder being oxygen.

2. A coating composition of claim 1 wherein the organic polymer is a hydrolyzed copolymer of tetrafluoroethylene and a vinyl ester.

3. A coating composition of claim 1 wherein the organic polymer is a copolymer of tetrafluoroethylene and an ω-hydroxyalkyl vinyl ether.

4. A coating composition of claim 1 wherein the organic polymer is polyvinyl butyral.

5. A coating composition of claim 1 wherein the organic polymer is polyvinyl alcohol.

6. A coating composition of claim 1 wherein the organic polymer is a hydrolyzed copolymer of tetrafluoroethylene and vinyl acetate.

7. A coating composition of claim 1 wherein the organic polymer is a copolymer of tetrafluoroethylene and 2-hydroxyethyl vinyl ether.

8. A coating composition of claim 1 wherein the organic polymer is a copolymer of tetrafluoroethylene and 4-hydroxybutyl vinyl ether.

9. A coating composition of claim 1 wherein the organic polymer is a copolymer of tetrafluoroethylene and 3-hydroxypropyl vinyl ether.

References Cited

UNITED STATES PATENTS

| | | | |
|---|---|---|---|
| 2,404,357 | 7/1946 | Bechtold | 117—138.8 |
| 2,404,426 | 7/1946 | Bechtold et al. | 117—138.8 |
| 2,440,711 | 5/1948 | Bechtold | 117—72 |
| 2,834,748 | 5/1958 | Bailey et al. | 260—825 |
| 2,917,480 | 12/1959 | Bailey et al. | 260—825 |
| 3,305,504 | 2/1967 | Huntington | 260—825 |

SAMUEL H. BLECH, Primary Examiner

U.S. Cl. X.R.

117—72, 124, 132, 138.8, 148, 161; 260—29.2, 29.6, 31.2, 33.2, 33.4, 33.8, 37, 41, 80.75, 87.1, 88.1, 448.2, 824, 827